US010107376B2

(12) United States Patent
Okuno et al.

(10) Patent No.: US 10,107,376 B2
(45) Date of Patent: Oct. 23, 2018

(54) SINTERED MACHINE PART AND METHOD OF MANUFACTURING THE SAME

(71) Applicants:NTN CORPORATION, Osaka (JP); Takahiro Okuno, Mie (JP); Naoki Yashiro, Mie (JP); Kouya Oohira, Mie (JP)

(72) Inventors: Takahiro Okuno, Mie (JP); Naoki Yashiro, Mie (JP); Kouya Oohira, Mie (JP)

(73) Assignee: NTN CORPORATION, Osaka (JP)

( * ) Notice: Subject to any disclaimer, the term of this patent is extended or adjusted under 35 U.S.C. 154(b) by 127 days.

(21) Appl. No.: 14/901,887

(22) PCT Filed: Jun. 3, 2014

(86) PCT No.: PCT/JP2014/064707
§ 371 (c)(1),
(2) Date: Dec. 29, 2015

(87) PCT Pub. No.: WO2015/001894
PCT Pub. Date: Jan. 8, 2015

(65) Prior Publication Data
US 2016/0369881 A1    Dec. 22, 2016

(30) Foreign Application Priority Data

Jul. 2, 2013 (JP) ................. 2013-139080

(51) Int. Cl.
| | |
|---|---|
| *C22C 33/02* | (2006.01) |
| *F16H 55/06* | (2006.01) |
| *B22F 1/00* | (2006.01) |
| *B22F 5/08* | (2006.01) |
| *C22C 38/00* | (2006.01) |
| *B22F 3/16* | (2006.01) |
| *C22C 38/08* | (2006.01) |
| *C22C 38/12* | (2006.01) |
| *F16H 53/02* | (2006.01) |
| *F16H 55/17* | (2006.01) |
| *B22F 3/02* | (2006.01) |

(52) U.S. Cl.
CPC ............... *F16H 55/06* (2013.01); *B22F 1/00* (2013.01); *B22F 1/007* (2013.01); *B22F 1/0059* (2013.01); *B22F 3/16* (2013.01); *B22F 5/08* (2013.01); *C22C 33/0264* (2013.01); *C22C 38/00* (2013.01); *C22C 38/08* (2013.01); *C22C 38/12* (2013.01); *F16H 53/025* (2013.01); *F16H 55/17* (2013.01); *B22F 2003/026* (2013.01); *B22F 2301/35* (2013.01); *B22F 2302/40* (2013.01); *B22F 2304/10* (2013.01); *B22F 2998/10* (2013.01)

(58) Field of Classification Search
None
See application file for complete search history.

(56) References Cited

U.S. PATENT DOCUMENTS

| | | | | |
|---|---|---|---|---|
| 6,652,618 | B1 * | 11/2003 | Unami | C22C 33/0207 75/243 |
| 2001/0038801 | A1 * | 11/2001 | Ueda | C22C 33/02 419/11 |
| 2002/0159908 | A1 | 10/2002 | Yoshimura et al. | |
| 2003/0219617 | A1 | 11/2003 | Ozaki et al. | |
| 2004/0144203 | A1 * | 7/2004 | Unami | B22F 1/0059 75/243 |
| 2005/0244295 | A1 | 11/2005 | Skoglund et al. | |
| 2009/0041608 | A1 | 2/2009 | Ozaki et al. | |
| 2016/0327144 | A1 | 11/2016 | Okuno et al. | |

FOREIGN PATENT DOCUMENTS

| | | |
|---|---|---|
| CN | 1517165 | 8/2004 |
| CN | 101384387 | 3/2009 |
| EP | 3 097 999 | 11/2016 |
| JP | 48-7967 | 3/1973 |
| JP | 4-337001 | 11/1992 |
| JP | 8-20849 | 1/1996 |
| JP | 9-202934 | 8/1997 |
| JP | 9-279204 | 10/1997 |
| JP | 2000-355726 | 12/2000 |
| JP | 2004-232079 | 8/2004 |
| JP | 2007-537359 | 12/2007 |
| JP | 2008-169460 | 7/2008 |
| JP | 2009-221576 | 10/2009 |
| JP | 2009-263697 | 11/2009 |
| WO | 2012-063628 | * 5/2012 |
| WO | 2014/103999 | 7/2014 |

OTHER PUBLICATIONS

Extended European Search Report dated Jan. 31, 2017 in corresponding European Application No. 14819452.5.
Notice of Reasons for Refusal dated Apr. 27, 2017 in corresponding Japanese Application No. 2013-139080, with English translation.
International Search Report dated Aug. 19, 2014 in International (PCT) Application No. PCT/JP2014/064707.
First Office Action dated Dec. 16, 2016 in corresponding Chinese Application No. 201480035641.9, with partial English translation.
International Preliminary Report on Patentability and Written Opinion of the International Searching Authority dated Jan. 5, 2016 in International (PCT) Application No. PCT/JP2014/064707.
Office Action dated Aug. 3, 2017 in corresponding Chinese Application No. 201480035641.9, with English Translation of Search Report.
Office Action dated Feb. 5, 2018 in Chinese Patent Application No. 201480035641.9, with English translation of Chinese Search Report.
Yoshida et al. "Mechanical Properties of High Strength Pre-alloyed Steel Powders", R&D Kobe Steel Engineering Reports, vol. 47 No. 2 pp. 54-57 (Sep. 1997), with English Abstract.

* cited by examiner

*Primary Examiner* — Jessee R Roe
*Assistant Examiner* — Ngoclan T Mai
(74) *Attorney, Agent, or Firm* — Wenderoth, Lind & Ponack, L.L.P.

(57) ABSTRACT

A sintered compact having a density of 7.5 g/cm³ or more is formed by mixed powder. The mixed powder is obtained by mixing graphite powder having an average particle diameter of 8 μm or less and diffusion alloyed steel powder. The ratio of the graphite powder is from 0.05 wt % to 0.35 wt % with respect to 100 wt % of the diffusion alloyed steel powder. Or, the mixed powder is obtained by mixing the graphite powder and completely alloyed steel powder. The ratio of the graphite powder is from 0.15 wt % to 0.35 wt % with respect to 100 wt % of the completely alloyed steel powder.

8 Claims, 1 Drawing Sheet

SINTERED MACHINE PART AND METHOD OF MANUFACTURING THE SAME

TECHNICAL FIELD

The present invention relates to a sintered machine part and a method of manufacturing the same.

BACKGROUND ART

A sintered compact is obtained by subjecting mixed metal powder to compression molding, and then sintering the resultant at a predetermined temperature. The sintered compact is employed for a machine part and the like, because the sintered compact enables production of a net shape product or a near-net shape product and hence a reduction in cost can be achieved through an increase in yield and a reduction in number of processing steps. Of such sintered compacts, an iron-based sintered compact is widely employed for an automobile part, an electric product, and the like by virtue of excellent mechanical properties.

However, many pores remain in the inside of the sintered compact. Those pores serve as stress concentration sources to show behavior such as cracks in an ingot material, which causes a reduction in static strength, such as tensile/compression/bending strength or impact strength, and a reduction in dynamic strength, such as fatigue strength.

For example, there is known a technology for realizing densification of the sintered compact by alternately performing a compression molding step and a sintering step twice on the mixed powder (for example, Patent Literature 1). However, in this case, there is a problem of a rise in production cost.

For example, in Patent Literature 2, densification of the sintered compact is realized by using metal powder having a coarse particle size distribution without using costly treatment, such as the two-stage molding and two-stage sintering.

CITATION LIST

Patent Literature 1: JP 04-337001 A
Patent Literature 2: JP 2007-537359 A

SUMMARY OF INVENTION

Technical Problem

However, the iron-based sintered compact cannot be densified up to an ultra-high density of 7.5 g/cm$^3$ or more in some cases by merely using metal powder having a coarse particle size as in Patent Literature 2.

An object of the present invention is to increase the density of a machine part formed of an iron-based sintered metal up to 7.5 g/cm$^3$ or more by a low-cost method.

Solution to Problem

When a compression molded body (green compact) of mixed powder is sintered, graphite powder blended in the mixed powder is solid solved in alloyed steel powder. Therefore, spaces in which the graphite powders are present become pores. In general, the graphite powder to be used is fine as compared to the alloyed steel powder, and hence the pores associated with the solid solution of the graphite powder described above are fine. Therefore, in the case of an iron-based sintered compact in which its density is not so high (that is, a sintered compact having some pores in its inside), an influence of the pores associated with the solid solution of the graphite powder described above is not considered, because the influence is small. In contrast, the inventors of the present invention have examined to reveal that, in the case of a sintered compact having an ultra-high density of 7.5 g/cm$^3$ or more, the density of the sintered compact is largely affected by the size and blending ratio of the graphite powder. In view of the foregoing, in the present invention, extremely fine graphite powder having an average particle diameter of 8 μm or less is used, and the blending ratio of the graphite powder in the mixed powder is set to be low (in the case of using diffusion alloyed steel powder, the blending ratio is from 0.05 wt % to 0.35 wt % with respect to 100 wt % of the alloyed steel powder, and in the case of using completely alloyed steel powder, the blending ratio is from 0.15 wt % to 0.35 wt % with respect to 100 wt % of the alloyed steel powder). With this, the density of the sintered compact can be increased up to an ultra-high density of 7.5 g/cm$^3$ or more without using a high-cost method, such as the two-stage molding and two-stage sintering.

That is, according to one embodiment of the present invention, there is provided a sintered machine part, which is formed by mixed powder containing alloyed steel powder and graphite powder, wherein: the alloyed steel powder consists of diffusion alloyed steel powder; a ratio of the graphite powder is from 0.05 wt % to 0.35 wt % with respect to 100 wt % of the alloyed steel powder; the graphite powder has an average particle diameter of 8 μm or less; and the sintered machine part has a density of 7.5 g/cm$^3$ or more. According to another embodiment of the present invention, there is provided a sintered machine part, which is formed by mixed powder containing alloyed steel powder and graphite powder, wherein: the alloyed steel powder consists of completely alloyed steel powder; a ratio of the graphite powder is from 0.15 wt % to 0.35 wt % with respect to 100 wt % of the alloyed steel powder; the graphite powder has an average particle diameter of 8 μm or less; and the sintered machine part has a density of 7.5 g/cm$^3$ or more.

According to another embodiment of the present invention, there is provided a method of manufacturing a sintered machine part, the method comprising: a mixing step of mixing graphite powder having an average particle diameter of 8 μm or less and diffusion alloyed steel powder so that a ratio of the graphite powder is from 0.05 wt % to 0.35 wt % with respect to 100 wt % of the diffusion alloyed steel powder, to obtain mixed powder; a compacting step of subjecting the mixed powder to compression molding, to obtain a green compact; and a sintering step of sintering the green compact at a predetermined sintering temperature, to obtain a sintered compact having a density of 7.5 g/cm$^3$ or more. According to another embodiment of the present invention, there is provided a method of manufacturing a sintered machine part, the method comprising: a mixing step of mixing graphite powder having an average particle diameter of 8 μm or less and completely alloyed steel powder so that a ratio of the graphite powder is from 0.15 wt % to 0.35 wt % with respect to 100 wt % of the completely alloyed steel powder, to obtain mixed powder; a compacting step of subjecting the mixed powder to compression molding, to obtain a green compact; and a sintering step of sintering the green compact at a predetermined sintering temperature, to obtain a sintered compact having a density of 7.5 g/cm$^3$ or more.

When powder from which coarse particles have been removed by allowing the powder to pass through a sieve having an opening of 180 μm is used as the alloyed steel powder in the mixed powder, the formation of coarse pores can be prevented in the sintered compact with certainty.

As the alloyed steel powder, for example, diffusion alloyed steel powder in which Ni is diffused on and adheres onto a periphery of an Fe—Mo alloy may be used. In this case, the diffusion alloyed steel powder preferably comprises, as a composition, 1.5 wt % to 2.3 wt % of Ni and 0.5 wt % to 1.5 wt % of Mo, with the balance being Fe and inevitable impurities.

Alternatively, as the alloyed steel powder, Fe—Mo—Ni completely alloyed steel powder may be used. In this case, the completely alloyed steel powder preferably comprises, as a composition, 0.5 wt % to 0.7 wt % of Ni and 0.6 wt % to 1.1 wt % of Mo, with the balance being Fe and inevitable impurities.

The sintered machine part may preferably be used as a gear or a cam.

Advantageous Effects of Invention

As described above, according to the embodiments of the present invention, the density of the machine part formed of an iron-based sintered metal can be increased up to 7.5 g/cm$^3$ or more by a low-cost method.

DESCRIPTION OF EMBODIMENTS

Figure 1:
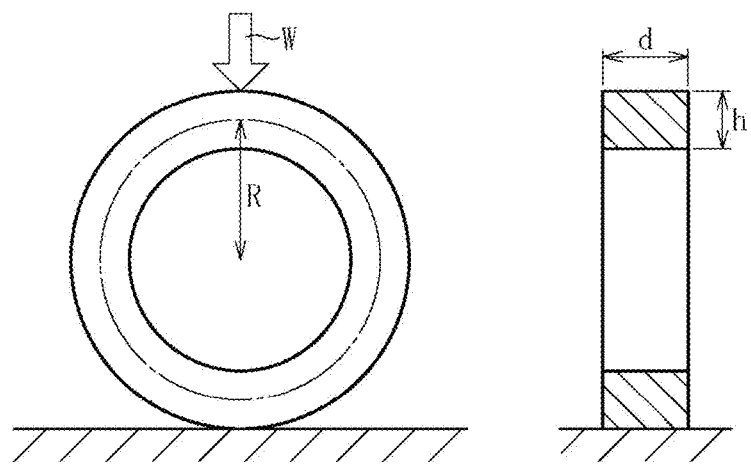
FIG. 1 includes a side view and a sectional view of a cylindrical test piece to be used in a ring compression fatigue strength test.

A method of manufacturing a sintered machine part according to one embodiment of the present invention is described below. In this embodiment, a sintered machine part is manufactured through a mixing step, a compression molding step, a sintering step, and a heat treatment step.

In the mixing step, alloyed steel powder, graphite powder, and a lubricant are mixed at a predetermined ratio.

For example, alloyed steel powder may contain as alloy components Ni and Mo, with the balance being Fe and inevitable impurities. Ni has effects of enhancing the mechanical properties of a sintered compact and improving the toughness of the sintered compact after heat treatment. In addition, Mo has effects of enhancing the mechanical properties of the sintered compact and improving the hardening property of the sintered compact during the heat treatment. It is desired that the alloyed steel powder be subjected to classification by being allowed to pass through a sieve having an opening of 180 μm in advance.

As the alloyed steel powder, there may be used, for example, diffusion alloyed steel powder in which a metal other than Fe is diffused on and adheres onto the periphery of an Fe alloy, specifically, diffusion alloyed steel powder in which at least one kind of Ni, Mo, Mn, and Cr is diffused on and adheres onto the periphery of the Fe alloy. In this embodiment, diffusion alloyed steel powder in which Ni is diffused on and adheres onto the periphery of an Fe—Mo alloy is used. When a metal, such as Ni, is diffused on and adheres onto an Fe alloy as described above, the hardness of the alloyed steel powder is reduced before sintering, and hence moldability during compression molding is ensured. As a result, Ni can be blended in a relatively large amount. Specifically, in this embodiment, the blending ratio of Ni in the diffusion alloyed steel powder is from 1.5 wt % to 2.3 wt %, preferably from 1.7 wt % to 2.2 wt %. In addition, Mo has the effect of improving the hardening property, but its addition in a large amount causes a reduction in moldability with the effect saturated. Therefore, the blending ratio of Mo in the diffusion alloyed steel powder is from 0.5 wt % to 1.5 wt %, preferably from 0.8 wt % to 1.2 wt %, more preferably from 0.9 wt % to 1.1 wt %.

In addition, as the alloyed steel powder, there may be used completely alloyed steel powder, specifically, completely alloyed steel powder formed of Fe and at least one kind of Ni, Mo, Mn, and Cr. In this embodiment, Fe—Mo—Ni completely alloyed steel powder is used. In this case, the blending ratio of Ni in the completely alloyed steel powder is from 0.45 wt % to 0.9 wt %, preferably from 0.5 wt % to 0.7 wt %, more preferably from 0.5 wt % to 0.6 wt %. The blending ratio of Mo in the completely alloyed steel powder is from 0.6 wt % to 1.1 wt %, preferably from 0.8 wt % to 1.1 wt %, more preferably from 0.9 wt % to 1.1 wt %.

For example, artificial graphite is used as the graphite powder. The graphite powder to be used has an average particle diameter of 8 μm or less, preferably from 2 μm to 6 μm, more preferably from 3 μm to 4 μm. In the case of using the diffusion alloyed steel powder as the alloyed steel powder, the blending ratio of the graphite powder is from 0.05 wt % to 0.35 wt %, preferably from 0.1 wt % to 0.3 wt %, more preferably from 0.15 wt % to 0.25 wt %, with respect to 100 wt % of the alloyed steel powder. On the other hand, in the case of using the completely alloyed steel powder as the alloyed steel powder, the blending ratio of the graphite powder is from 0.15 wt % to 0.35 wt %, preferably from 0.15 wt % to 0.25 wt %, with respect to 100 wt % of the alloyed steel powder.

The lubricant is added for the purpose of reducing friction between a mold and the mixed powder or between the mixed powders during the compression molding of the mixed powder. As the lubricant, metal soap, amide wax, or the like is used. For example, ethylene bis(stearamide) (EBS) is used.

In the compression molding step, the mixed powder is loaded into a cavity of a mold and subjected to compression molding, to form a green compact having a predetermined shape. In this step, temperature during the molding is preferably room temperature or more and the melting point of the lubricant or less. In particular, when the molding is performed at a temperature lower than the melting point of the lubricant by from 10° C. to 20° C., the yield strength of the powder is reduced and its compressibility is increased, and hence a molding density can be increased. In addition, a coating for reducing friction (such as a DLC coating) may be formed on the surface of the mold, as required.

When molding pressure is increased, the density of the green compact can be increased. However, when the molding pressure is excessively increased, for example, delamination resulting from density unevenness is caused in the inside of the green compact, or the mold is broken. In this embodiment, the compression molding step is performed at a molding pressure of approximately from 1,000 MPa to 1,400 MPa, and the density of the green compact is 7.4 g/cm$^3$ or more.

Next, in the sintering step, the green compact is sintered at a predetermined sintering temperature. The sintering temperature is set within a range of, for example, from 1,100° C. to 1,350° C. The sintering step is performed under an inert atmosphere, such as a mixed gas of nitrogen and hydrogen, or an argon gas. When the green compact is sintered, the graphite powder in the green compact is solid solved in the alloyed steel powder, and the spaces in which the graphite powders are present become pores. Along with this, the alloyed steel powders are sintered to be bonded to each other, and hence the entirety of the green compact is contracted. As a result, an effect of increasing the density associated with the contraction of the green compact surpasses an effect of reducing the density associated with the solid solution of the graphite powder, and the density of the sintered compact becomes higher than the density of the green compact. The density of the sintered compact is 7.5 g/cm³ or more, preferably 7.55 g/cm³ or more, more preferably 7.6 g/cm³ or more.

After that, the sintered compact is subjected to heat treatment. In this embodiment, the sintered compact is subjected to treatment involving carburizing, quenching, and tempering. With this, surface hardness is increased and inner toughness is ensured, resulting in suppression of the development of cracks.

Through the above-mentioned steps, a sintered machine part according to one embodiment of the present invention is completed. The sintered machine part may be used as, for example, a gear or a cam. In the case of using the diffusion alloyed steel powder, the sintered machine part has an inner hardness of from 300 HV to 500 HV (preferably from 400 HV to 500 HV), a radial crushing strength of 1,750 MPa or more (preferably 1,900 MPa or more, more preferably 2,000 MPa or more), and a ring compression fatigue strength of 290 MPa or more (preferably 315 MPa or more, more preferably 340 MPa or more). On the other hand, in the case of using the completely alloyed steel powder, the sintered machine part has an inner hardness of from 300 HV to 500 HV (preferably from 350 HV to 450 HV), a radial crushing strength of 1,500 MPa or more (preferably 1,600 MPa or more), and a ring compression fatigue strength of 290 MPa or more (preferably 315 MPa or more).

Example 1

In order to confirm the effects of the present invention, the following evaluation tests were performed. SIGMALOY 2010 manufactured by JFE Steel Corporation was used as partially diffusion alloyed steel powder. 46F4H manufactured by Kobe Steel, Ltd. was used as completely alloyed steel powder. ACRAWAX C manufactured by LONZA Japan was added at 0.5 wt % as a lubricant. Artificial graphite was used as graphite powder. Mixed powder obtained by mixing those components was used to produce test pieces through a compression molding step, a sintering step, and a heat treatment step. The test pieces each had a cylindrical shape having an outer diameter of φ23.2 mm, an inner diameter of φ16.4 mm, and a size in an axial direction of 7 mm. The sintering step was performed at 1,250° C. for 150 minutes in a tray pusher furnace under a nitrogen and hydrogen atmosphere. The heat treatment step was performed through carburizing treatment under the condition of 880° C. and 60 minutes, quenching at 840° C., and tempering under the condition of 180° C. and 60 minutes.

The test pieces with their compositions varied as described below were each measured for the sintering density, hardnesses, radial crushing strength, and ring compression fatigue strength. The sintering density, surface hardness (Rockwell HRA), inner hardness (Vickers HV0.1), and radial crushing strength were measured by methods in conformity to JIS Z2501, JIS Z2245, JIS Z2244, and JIS Z2507, respectively. The test for the radial crushing strength was performed under the condition of stroke control at 0.5 mm/min.

As the ring compression fatigue strength, a value measured by the following method is used. As illustrated in FIG. 1, the radius of each cylindrical test piece (radius to the middle of its thickness) is defined as R, the thickness is defined as h, and the size in an axial direction is defined as d. A repeated load W in a diameter direction is applied to the test piece until the test piece is broken. A difference between a local maximum value and a local minimum value of the repeated load W is set to 0.1. A maximum tensile stress $\sigma_{max}$ in the case where the breakage does not occur even when the repealed load W is continuously applied $1 \times 10^7$ times is used as the ring compression fatigue strength of the test piece. It should be noted that the maximum tensile stress $\sigma_{max}$ is defined by the following mathematical equation 1.

$$\sigma_{max} = \frac{M}{AR}\left(\frac{1}{\kappa} \cdot \frac{\frac{h}{2}}{R-\frac{h}{2}} - 1\right) \qquad \text{[Mathematical Equation 1]}$$

In the equation, A represents the sectional area of the test piece, and is represented by A=d·h. The maximum bending moment M is represented by M=0.318 WR. The section modulus K is represented by the following mathematical equation 2.

$$\kappa = \frac{R}{h}\left(\ln\frac{1+\frac{h}{2R}}{1-\frac{h}{2R}}\right) - 1 \qquad \text{[Mathematical Equation 2]}$$

(1) With Regard to Addition Amount of Graphite Powder

First, the characteristics of sintered compacts with varying addition amounts of the graphite powders in the mixed powders were compared. Specifically, test pieces in which the addition amounts of the artificial graphite having an average particle diameter of 3.4 μm were varied within a range of from 0 wt % to 0.8 wt % were produced, and the test pieces were each measured for the sintering density, surface hardness, inner hardness, radial crushing strength, and ring compression fatigue strength. It should be noted that the sintering density and the surface hardness were values for each sintered compact before the heat treatment, and the inner hardness, the radial crushing strength, and the ring compression fatigue strength were values for each sintered compact after the heat treatment. The evaluation criteria for the radial crushing strength were as follows: the case of less than 1,600 MPa was evaluated as "x"; the case of from 1,600 MPa to 1,750 MPa was evaluated as "Δ"; the case of from 1,750 MPa to 1,900 MPa was evaluated as "○"; and the case of 1,900 MPa or more was evaluated as "⊙ (double circle)". The evaluation criteria for the ring compression fatigue strength were as follows: the case of less than 290 MPa was evaluated as "x"; the case of from 290 MPa to 315 MPa was evaluated as "Δ"; the case of from 315 MPa to 340 MPa was evaluated as "○"; and the case of 340 MPa or more was evaluated as "⊙ (double circle)". The results are shown in Table 1 and Table 2 below.

TABLE 1

|  | Example 1 | Example 2 | Example 3 | Comparative Example 1 | Comparative Example 2 | Comparative Example 3 |
|---|---|---|---|---|---|---|
| Used powder | SIGMALOY 2010 (diffusion alloyed steel powder) | | | | | |
| Average particle diameter of graphite powder μm | 3.4 | 3.4 | 3.4 | 3.4 | 3.4 | 3.4 |
| Addition amount of graphite powder wt. % | 0.1 | 0.2 | 0.3 | 0 | 0.4 | 0.8 |
| Sintering density g/cm³ | 7.6 | 7.58 | 7.56 | 7.6 | 7.54 | 7.49 |
| Surface hardness HRA | 49 | 54 | 55 | 42 | 57 | 62 |
| Inner hardness HV0.1 | 300 | 430 | 500 | 200 | 600 | 800 |
| Radial crushing strength MPa | ○ | ◎ | ○ | X | Δ | X |
| Ring compression fatigue strength MPa | Δ | ◎ | Δ | X | X | X |

TABLE 2

|  | Example 4 | Example 5 | Comparative Example 4 | Comparative Example 5 | Comparative Example 6 | Comparative Example 7 |
|---|---|---|---|---|---|---|
| Used powder | 46F4H (completely alloyed steel powder) | | | | | |
| Average particle diameter of graphite powder μm | 3.4 | 3.4 | 3.4 | 3.4 | 3.4 | 3.4 |
| Addition amount of graphite powder wt. % | 0.2 | 0.3 | 0 | 0.1 | 0.4 | 0.8 |
| Sintering density g/cm³ | 7.53 | 7.5 | 7.55 | 7.53 | 7.49 | 7.43 |
| Surface hardness HRA | 49 | 46 | 33 | 35 | 55 | 57 |
| Inner hardness HV0.1 | 400 | 500 | 200 | 250 | 580 | 800 |
| Radial crushing strength MPa | ○ | Δ | X | X | X | X |
| Ring compression fatigue strength MPa | ○ | Δ | X | X | X | X |

From the results shown in Table 1, it can be said that, in the case of using the diffusion alloyed steel powder, it is desired that the addition amount of the graphite powder be from 0.05 wt % to 0.35 wt %, preferably from 0.1 wt % to 0.3 wt %, more preferably from 0.15 wt % to 0.25 wt %. In addition, from the results shown in Table 2, it can be said that, in the case of using the completely alloyed steel powder, it is desired that the addition amount of the graphite powder be from 0.15 wt % to 0.35 wt %, preferably from 0.15 wt % to 0.25 wt %.

(2) With Regard to Particle Diameter of Graphite Powder

Next, the characteristics of sintered compacts with varying particle diameters of the graphite powders in the mixed powders were compared. Specifically, test pieces were produced by using the artificial graphite in which their average particle diameters were varied within a range of from 1.0 μm to 10.0 μm, and the test pieces were each measured for the sintering density. The results are shown in Table 3 below. The evaluation criteria for the sintering density were as follows: the case of less than 7.47 g/cm³ was evaluated as "x"; the case of from 7.47 g/cm³ to 7.50 g/cm³ was evaluated as "Δ"; and the case of 7.50 g/cm³ or more was evaluated as "○".

TABLE 3

|  | Example 4 | Example 6 | Example 7 | Example 8 | Comparative Example 8 |
|---|---|---|---|---|---|
| Used powder | 46F4H (completely alloyed steel powder) | | | | |
| Average particle diameter of graphite powder μm | 3.4 | 1.0 | 2.4 | 8.0 | 10.0 |
| Addition amount of graphite powder wt. % | 0.2 | ← | ← | ← | ← |
| Sintering density g/cm³ | ○ | Δ | Δ | Δ | x |

From the results shown in Table 3, it can be said that it is desired that the average particle diameter of the graphite powder be 8 μm or less, preferably 6 μm or less, more preferably 4 μm or less. In addition, from those results, it can be said that it is desired that the average particle diameter of the graphite powder be 1 μm or more, preferably 2 μm or more, more preferably 3 μm or more.

(3) With Regard to Particle Size of Alloyed Steel Powder

Figure 2A:
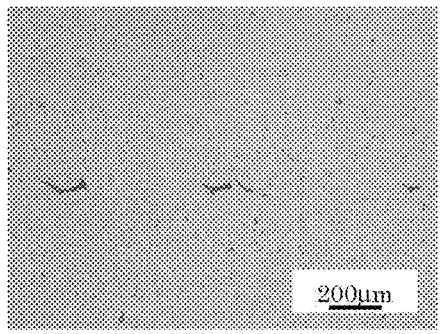
FIG. 2(A) is an enlarged view of a cross section of a test piece (product of Example) using powder subjected to classification.
Figure 2B:
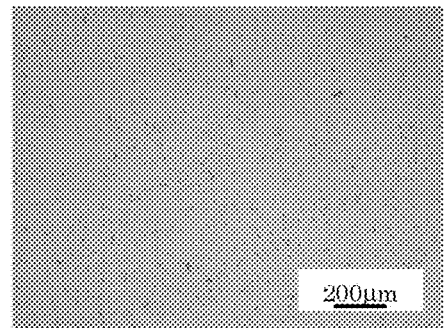
FIG. 2(B) is an enlarged view of a cross section of a test piece (product of Comparative Example) using powder not subjected to classification.

Next, the characteristics of sintered compacts with varying particle sizes of the alloyed steel powders were compared. Specifically, a test piece (product of Example) using alloyed steel powder subjected to classification and a test piece (product of Comparative Example) using alloyed steel powder not subjected to classification were compared to each other. The classification is performed by allowing the alloyed steel powder to pass through a sieve having an opening of 180 μm, to remove coarse particles. The results are shown in Table 4 below. In addition, the cross sections of the product of Example and the product of Comparative Example were observed. As a result, coarse pores having a maximum size of about 150 μm (the black portions represented pores) were observed in the cross section of the product of Comparative Example {see FIG. 2(A)}. In contrast, few coarse pores were observed in the cross section of the product of Example {see FIG. 2(B)}.

TABLE 4

| | Example 9 | Comparative Example 9 | Example 10 | Comparative Example 10 |
|---|---|---|---|---|
| Used powder | SIGMALOY 2010 (diffusion alloyed steel powder) | | 46F4H (completely alloyed steel powder) | |
| Passing through sieve having opening of 180 μm | Present | Absent | Present | Absent |
| Average particle diameter of graphite powder, μm | 3.4 | ← | ← | ← |
| Addition amount of graphite powder, wt. % | 0.2 | ← | ← | ← |
| Coarse pore (φ0.1 mm or more) | Absent | Present | Absent | Present |

From the results shown in Table 4 and FIG. 2, it was confirmed that the formation of coarse pores was suppressed by using the alloyed steel powder from which coarse particles had been removed by allowing the powder to pass through a sieve having an opening of 180 μm.

(4) With Regard to Addition Amount of Ni

Test pieces with varying addition amounts of Ni in the alloyed steel powders were each measured for the sintering density and radial crushing strength. The results are shown in Table 5 and Table 6 below. The evaluation criteria for the sintering density were as follows: the case of less than 7.50 g/cm³ was evaluated as "x"; the case of from 7.50 g/cm³ to 7.55 g/cm³ was evaluated as "Δ"; the case of from 7.55 g/cm³ to 7.60 g/cm³ was evaluated as "○"; and the case of 7.60 g/cm³ or more was evaluated as "⊚ (double circle)". The evaluation criteria for the radial crushing strength were the same as in the section (1) described above.

TABLE 5

| | Example 11 | Example 12 | Example 13 | Example 14 | Comparative Example 11 |
|---|---|---|---|---|---|
| Kind of powder | Diffusion alloyed steel powder | | | | |
| Addition amount of Ni, wt. % | 2.0 | 1.5 | 1.7 | 2.3 | 2.5 |

TABLE 5-continued

| | Example 11 | Example 12 | Example 13 | Example 14 | Comparative Example 11 |
|---|---|---|---|---|---|
| Addition amount of Mo, wt. % | 1.0 | ← | ← | ← | ← |
| Sintering density, g/cm³ | ○ | ⊚ | ⊚ | Δ | X |
| Radial crushing strength, MPa | ⊚ | Δ | ○ | Δ | X |

TABLE 6

| | Example 15 | Example 16 | Comparative Example 12 | Comparative Example 13 | Comparative Example 14 |
|---|---|---|---|---|---|
| Kind of powder | Completely alloyed steel powder | | | | |
| Addition amount of Ni, wt. % | 0.5 | 0.7 | 0.4 | 0.2 | 1.0 |
| Addition amount of Mo, wt. % | 1.0 | ← | ← | ← | ← |
| Sintering density, g/cm³ | Δ | ○ | ○ | x | x |
| Radial crushing strength, MPa | ○ | Δ | x | x | x |

From the results shown in Table 5, it can be said that, in the case of using the diffusion alloyed steel powder, it is desired that the addition amount of Ni be from 1.5 wt % to 2.3 wt %, preferably approximately from 1.7 wt % to 2.2 wt %. In addition, it can be said that, in the case of using the completely alloyed steel powder, it is desired that the addition amount of Ni be from 0.45 wt % to 0.9 wt %, preferably approximately from 0.5 wt % to 0.7 wt %.

(5) With Regard to Addition Amount of Mo

Test pieces with varying addition amounts of Mo in the alloyed steel powders were each measured for the sintering density and radial crushing strength. The results are shown in Table 7 and Table 8 below. The evaluation criteria for the sintering density were the same as in the section (4) described above. The evaluation criteria for the radial crushing strength were the same as in the section (1) described above.

TABLE 7

| | Example 17 | Example 18 | Example 19 | Example 20 | Example 21 |
|---|---|---|---|---|---|
| Kind of powder | Diffusion alloyed steel powder | | | | |
| Addition amount of Ni, wt. % | 2.0 | ← | ← | ← | ← |
| Addition amount of Mo, wt. % | 0.5 | 0.8 | 1.0 | 1.2 | 1.5 |
| Sintering density, g/cm³ | ⊚ | ⊚ | ○ | Δ | Δ |
| Radial crushing strength, MPa | Δ | ○ | ⊚ | ○ | Δ |

TABLE 8

|  | Example 22 | Example 23 | Comparative Example 15 | Comparative Example 16 | Comparative Example 17 |
| --- | --- | --- | --- | --- | --- |
| Kind of powder | Completely alloyed steel powder | | | | |
| Addition amount of Ni, wt % | 0.5 | ← | ← | ← | ← |
| Addition amount of Mo, wt % | 0.8 | 1.0 | 0.5 | 1.2 | 1.5 |
| Sintering density, g/cm³ | ○ | Δ | ○ | x | x |
| Radial crushing strength, MPa | Δ | ○ | x | Δ | x |

From the results shown in Table 7, it can be said that, in the case of using the diffusion alloyed steel powder, it is desired that the addition amount of Mo be from 0.5 wt % to 1.5 wt %, preferably approximately from 0.8 wt % to 1.2 wt %. In addition, it can be said that, in the case of using the completely alloyed steel powder, it is desired that the addition amount of Mo be from 0.6 wt % to 1.1 wt %, preferably from 0.8 wt % to 1.1 wt %.

The invention claimed is:

1. A sintered machine part, which is formed by mixed powder containing alloyed steel powder and graphite powder,
   wherein:
   the alloyed steel powder consists of diffusion alloyed steel powder;
   a ratio of the graphite powder is from 0.05 wt % to 0.35 wt % with respect to 100 wt % of the alloyed steel powder;
   the graphite powder has an average particle diameter of 8 μm or less;
   the sintered machine part has a density of 7.55 g/cm³ or more and a radial crushing strength of 1,600 MPa or more;
   the diffusion alloyed steel powder consists of powder in which Ni is diffused on and adheres onto a periphery of an Fe—Mo alloy; and
   the diffusion alloyed steel powder comprises 1.5 wt % to 2.3 wt % of Ni and 0.5 wt % to 1.5 wt % of Mo, with the balance being Fe and inevitable impurities.

2. The sintered machine part according to claim 1, wherein the alloyed steel powder comprises powder having passed through a sieve having an opening of 180 μm.

3. The sintered machine part according to claim 1, wherein the sintered machine part is a gear or a cam.

4. A sintered machine part, which is formed by mixed powder containing alloyed steel powder and graphite powder,
   wherein:
   the alloyed steel powder consists of completely alloyed steel powder;
   a ratio of the graphite powder is from 0.15 wt % to 0.35 wt % with respect to 100 wt % of the alloyed steel powder;
   the graphite powder has an average particle diameter of 8 μm or less;
   the sintered machine part has a density of 7.5 g/cm³ or more and a radial crushing strength of 1,600 MPa or more;
   the completely alloyed steel powder consists of Fe—Mo—Ni completely alloyed steel powder; and
   wherein the completely alloyed steel powder comprises 0.45 wt % to 0.9 wt % of Ni and 0.6 wt % to 1.1 wt % of Mo, with the balance being Fe and inevitable impurities.

5. The sintered machine part according to claim 4, wherein the alloyed steel powder comprises powder having passed through a sieve having an opening of 180 μm.

6. The sintered machine part according to claim 4, wherein the sintered machine part is a gear or a cam.

7. A method of manufacturing a sintered machine part, the method comprising:
   a mixing step of mixing graphite powder having an average particle diameter of 8 μm or less and diffusion alloyed steel powder, which consists of powder in which Ni is diffused on and adheres onto a periphery of an Fe—Mo alloy and comprises 1.5 wt % to 2.3 wt % of Ni and 0.5 wt % to 1.5 wt % of Mo, with the balance being Fe and inevitable impurities, so that a ratio of the graphite powder is from 0.05 wt % to 0.35 wt % with respect to 100 wt % of the diffusion alloyed steel powder, to obtain mixed powder;
   a compacting step of subjecting the mixed powder to compression molding, to obtain a green compact; and
   a sintering step of sintering the green compact at a predetermined sintering temperature, to obtain a sintered compact having a density of 7.55 g/cm³ or more and a radial crushing strength of 1,600 MPa or more.

8. A method of manufacturing a sintered machine part, the method comprising:
   a mixing step of mixing graphite powder having an average particle diameter of 8 μm or less and completely alloyed steel powder, which consists of Fe—Mo—Ni completely alloyed steel powder which comprises 0.45 wt % to 0.9 wt % of Ni and 0.6 wt % to 1.1 wt % of Mo, with the balance being Fe and inevitable impurities, so that a ratio of the graphite powder is from 0.15 wt % to 0.35 wt % with respect to 100 wt % of the completely alloyed steel powder, to obtain mixed powder;
   a compacting step of subjecting the mixed powder to compression molding, to obtain a green compact; and
   a sintering step of sintering the green compact at a predetermined sintering temperature, to obtain a sintered compact having a density of 7.5 g/cm³ or more and a radial crushing strength of 1,600 MPa or more.

* * * * *